(12) United States Patent
Wagner et al.

(10) Patent No.: US 12,400,246 B2
(45) Date of Patent: *Aug. 26, 2025

(54) FACILITATING RESPONDING TO MULTIPLE PRODUCT OR SERVICE REVIEWS ASSOCIATED WITH MULTIPLE SOURCES

(71) Applicant: Capital One Services, LLC, McLean, VA (US)

(72) Inventors: Jerry Wagner, Chesterfield, VA (US); Mario Munoz, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,025

(22) Filed: Dec. 13, 2023

(65) Prior Publication Data

US 2024/0112229 A1    Apr. 4, 2024

Related U.S. Application Data

(63) Continuation of application No. 17/809,067, filed on Jun. 27, 2022, now Pat. No. 11,869,050, which is a
(Continued)

(51) Int. Cl.
G06Q 30/0282    (2023.01)
G06F 9/54    (2006.01)
G06N 20/00    (2019.01)

(52) U.S. Cl.
CPC ........... G06Q 30/0282 (2013.01); G06F 9/54 (2013.01); G06N 20/00 (2019.01)

(58) Field of Classification Search
CPC .................. G06Q 30/014; G06Q 30/0282
See application file for complete search history.

(56) References Cited

U.S. PATENT DOCUMENTS 9,672,555 B1 *    6/2017    Dillard .................... G06F 16/35
9,922,649 B1    3/2018    Lore et al.
(Continued)

FOREIGN PATENT DOCUMENTS

WO    0159660 A1    8/2001

OTHER PUBLICATIONS

Fong et al., "Auto Defect Detection Using Customer Reviews for Product Recall Insurance Analysis," Frontiers in Applied Mathematics and Statistics, Jun. 2021, pp. 1-14, DOI: https://doi.org/10.3389/fams.2021.632847.
(Continued)

*Primary Examiner* — Andrew Chase Lakhani
(74) *Attorney, Agent, or Firm* — Harrity & Harrity, LLP

(57) ABSTRACT

A monitoring platform may obtain information that identifies a product or service and may collect one or more reviews associated with the product or service from a plurality of sources, wherein each review includes respective review information. The monitoring platform may process the one or more reviews to determine respective additional review information associated with each review of the one or more reviews. The monitoring platform may select, using a machine learning model, a particular review, of the one or more reviews, based on the review information and the additional review information associated with the one or more reviews. The monitoring platform may cause display, on a display of a client device, of a prompt for a response to the particular review and may obtain the response from the client device. The monitoring platform may cause the response to be posted to a source associated with the particular review.

20 Claims, 8 Drawing Sheets

Related U.S. Application Data continuation of application No. 16/405,823, filed on May 7, 2019, now Pat. No. 11,373,220.

(56) References Cited

U.S. PATENT DOCUMENTS

| | | | |
|---|---|---|---|
| 10,089,661 B1* | 10/2018 | Appalaraju | G06F 16/907 |
| 10,877,632 B2 | 12/2020 | Sarin et al. | |
| 10,963,333 B1* | 3/2021 | Nijim | G06F 11/0709 |
| 11,373,220 B2 | 6/2022 | Wagner et al. | |
| 2005/0091038 A1 | 4/2005 | Yi et al. | |
| 2006/0129446 A1 | 6/2006 | Ruhl et al. | |
| 2008/0215571 A1 | 9/2008 | Huang et al. | |
| 2008/0313130 A1 | 12/2008 | Hammond et al. | |
| 2009/0083096 A1 | 3/2009 | Cao et al. | |
| 2010/0063948 A1 | 3/2010 | Virkar et al. | |
| 2011/0040759 A1 | 2/2011 | Rappoport et al. | |
| 2011/0228665 A1* | 9/2011 | Kumar | H04L 41/0631 |
| | | | 370/216 |
| 2011/0288935 A1 | 11/2011 | Elvekrog et al. | |
| 2012/0095861 A1 | 4/2012 | Feng et al. | |
| 2013/0166374 A1 | 6/2013 | Capuozzo et al. | |
| 2013/0290333 A1 | 10/2013 | Fraczak et al. | |
| 2014/0230053 A1* | 8/2014 | Mote | G06Q 30/0282 |
| | | | 726/22 |
| 2014/0372805 A1* | 12/2014 | Rijnders | G06Q 10/06311 |
| | | | 714/37 |
| 2015/0287100 A1* | 10/2015 | Jain | G06Q 30/0273 |
| | | | 705/14.69 |
| 2016/0055250 A1* | 2/2016 | Rush | G06F 16/9535 |
| | | | 707/733 |
| 2016/0352805 A1 | 12/2016 | Seida | |
| 2017/0249241 A1* | 8/2017 | Seibert, Jr. | G06F 11/368 |
| 2017/0262869 A1 | 9/2017 | Jalali et al. | |
| 2017/0344889 A1 | 11/2017 | Sengupta et al. | |
| 2018/0047071 A1 | 2/2018 | Hsu et al. | |
| 2018/0121043 A1 | 5/2018 | Chowdhury et al. | |
| 2018/0349916 A1* | 12/2018 | Gaedcke | G06Q 30/0203 |
| 2019/0026786 A1 | 1/2019 | Khoury et al. | |
| 2019/0158610 A1* | 5/2019 | Holzband | H04L 51/52 |
| 2019/0179861 A1 | 6/2019 | Goldenstein et al. | |
| 2019/0349320 A1 | 11/2019 | Karuppusamy et al. | |
| 2021/0312058 A1* | 10/2021 | Chiarelli | G06Q 10/067 |
| 2022/0327588 A1 | 10/2022 | Wagner et al. | |

OTHER PUBLICATIONS

Gao et al., "Does Social Media Accelerate Product Recalls? Evidence From the Pharmaceutical Industry," Information Systems Research, Research Collection School of Computing and Information Systems, 2021, pp. 1-52.

Wikipedia., "Rule-based Machine Learning," Accessed Apr. 7, 2020, https://en.wikipedia.org/wiki/Rule-based_machine_learning (Year: 2020).

* cited by examiner

FACILITATING RESPONDING TO MULTIPLE PRODUCT OR SERVICE REVIEWS ASSOCIATED WITH MULTIPLE SOURCES

RELATED APPLICATION

This application is a continuation of U.S. patent application Ser. No. 17/809,067, filed Jun. 27, 2022, which is a continuation of U.S. patent application Ser. No. 16/405,823, filed May 7, 2019 (now U.S. Pat. No. 11,373,220), which are incorporated herein by reference in their entireties.

BACKGROUND

A user may create a review related to a product or service and post the review to a source, such as a website. The review may include text, images, video, and/or the like. In some situations, a company, associated with the product or service, may post a response to the review.

SUMMARY

According to some implementations, a method may include obtaining, by a device, information that identifies a product or service; collecting, by the device, one or more reviews associated with the product or service from a plurality of sources, wherein each review of the one or more reviews includes respective review information; processing, by the device, the one or more reviews to determine respective additional review information associated with each review of the one or more reviews; selecting, by the device and using a machine learning model, a particular review, of the one or more reviews, based on the review information and the additional review information associated with the one or more reviews; causing display, by the device and on a display of a client device, of a prompt for a response to the particular review; obtaining, by the device, the response from the client device; and causing, by the device, the response to be posted to a source associated with the particular review.

According to some implementations, a device may include one or more memories; and one or more processors, communicatively coupled to the one or more memories, configured to: obtain information that identifies a product or service; collect one or more reviews associated with the product or service from one or more sources, wherein each review of the one or more reviews includes respective review information; process the one or more reviews to determine respective additional review information associated with each review of the one or more reviews; select, using a machine learning model, a particular review, of the one or more reviews, based on the review information and the additional review information associated with the one or more reviews; cause one or more actions to be performed based on the particular review; obtain, after causing the one or more actions to be performed, a message regarding the one or more actions; cause display, on a display of a client device, of the message and a prompt for a response to the particular review; obtain the response from the client device; determine, based on the review information included in the particular review, a particular source, of the one or more sources, associated with the particular review; and cause the response to be posted to the particular source.

According to some implementations, a non-transitory computer-readable medium may store instructions that comprise one or more instructions that, when executed by one or more processors, cause the one or more processors to: obtain information that identifies a product or service; collect one or more reviews associated with the product or service from one or more sources, wherein each review of the one or more reviews includes respective review information; process the one or more reviews to determine respective additional review information associated with each review of the one or more reviews; select, using a machine learning model, a particular review, of the one or more reviews, based on the review information and the additional review information associated with the one or more reviews; generate a suggested response to the particular review; cause display, on a display of a client device, of a prompt for a response to the particular review and the suggested response; obtain the response from the client device; determine, based on the review information included in the particular review, a source, of the one or more sources, associated with the particular review; and cause the response to be posted to the source.

DETAILED DESCRIPTION

Figure 1A:
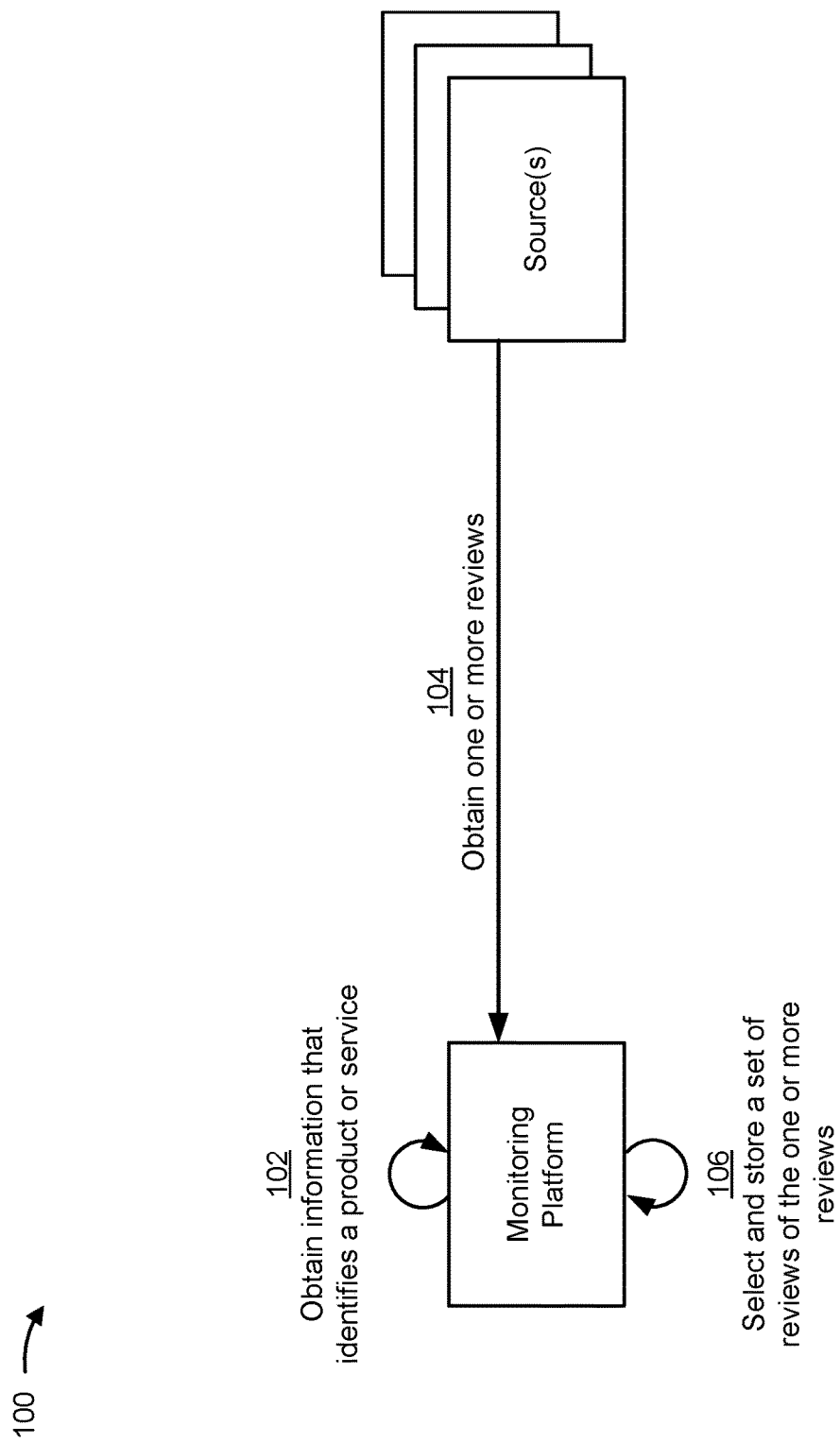
FIGS. 1A-1C are diagrams of one or more example implementations described herein.

The following detailed description of example implementations refers to the accompanying drawings. The same reference numbers in different drawings may identify the same or similar elements.

In some instances, a source, such as a website, an application, a program, and/or the like may include one or more reviews (e.g., the source may include one or more sections that display the one or more reviews). A review may include text, images, video, and/or the like related to a product or service. In some cases, a person is responsible for responding to reviews related to a particular product or service. However, to find and respond to relevant reviews, the person, using a user device, must visit and navigate multiple sources, search for the relevant reviews, create a user profile for each source of the multiple sources to respond to the relevant reviews associated with the source, create responses to respond to the relevant reviews, post the responses to the multiple sources, and/or the like. As such, the user device may consume excessive resources (e.g., memory resources, processing resources, power resources, communication resources, and/or the like) to perform these tasks. Moreover, the user device may unnecessarily consume resources to perform the same or similar tasks (e.g. navigating a source and searching for relevant reviews) even when there are no new reviews and/or no relevant reviews to respond to.

Some implementations described herein provide a monitoring platform that is capable of obtaining information that identifies a product or service, collecting one or more reviews associated with the product or service from a plurality of sources, and storing a set of reviews of the one or more reviews in a data structure that is accessible by a client device. In some implementations, for a review of the one or more reviews, the monitoring platform identifies review information included in the review and determines additional review information associated with the review. In some implementations, the monitoring platform may select a particular review of the one or more reviews based on the respective review information and/or the respective additional review information associated with each review of the one or more reviews. In some implementations, the monitoring platform may cause one or more actions to be performed based on the particular review. In some implementations, the monitoring platform may obtain a response to the particular review from the client device and cause the response to be posted to a source associated with the particular review.

In this way, the communication platform reduces a demand for resources (e.g., memory resources, power resources, communication resources, and/or the like) of a user device that would otherwise be used to respond to multiple product or service reviews associated with multiple sources. For example, the monitoring platform automatically crawls a plurality of sources to identify one or more reviews concerning a product or service and provides an interface for a user of a client device to respond to a particular review of the one or more reviews. The monitoring platform automatically performs all the functions for identifying relevant reviews, obtaining responses to the particular review, and posting the response to sources associated with the particular review, which reduces a need for a user device and/or the client device to consume additional resources to perform the same or similar functions.

Figure 1B:
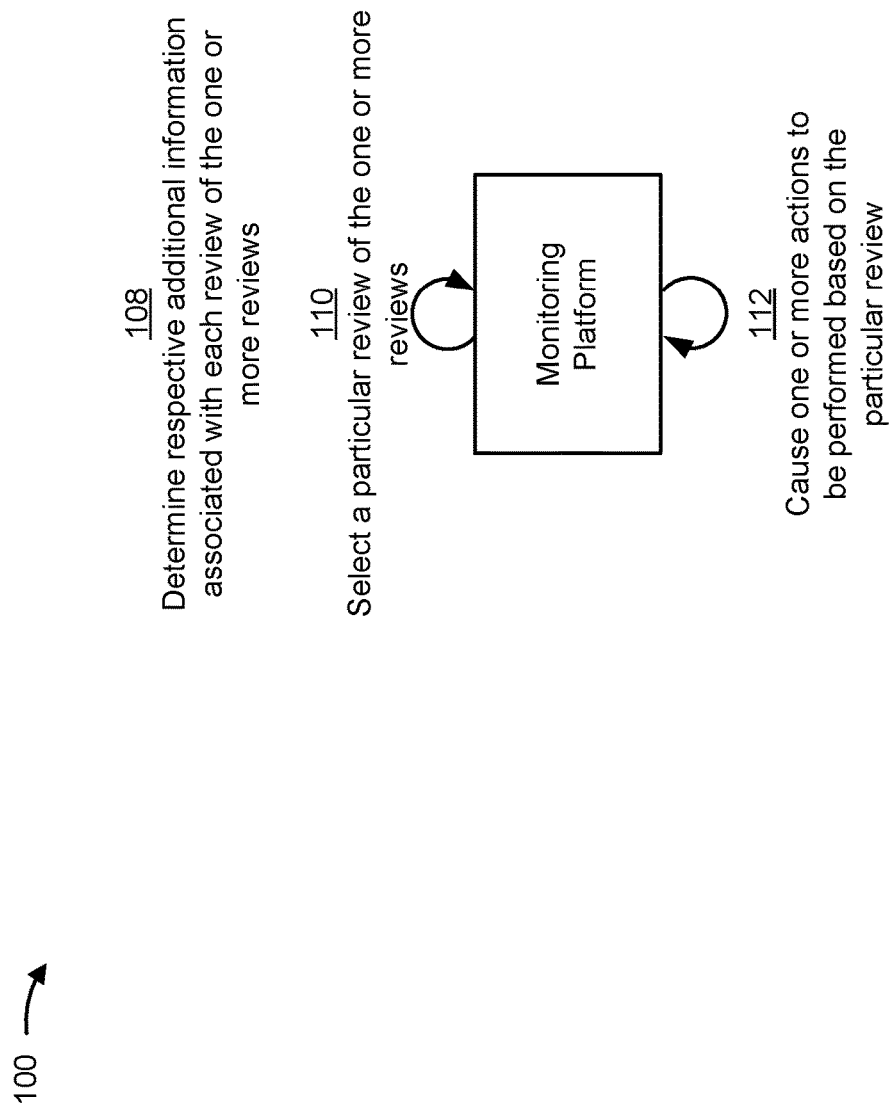
Figure 1C:
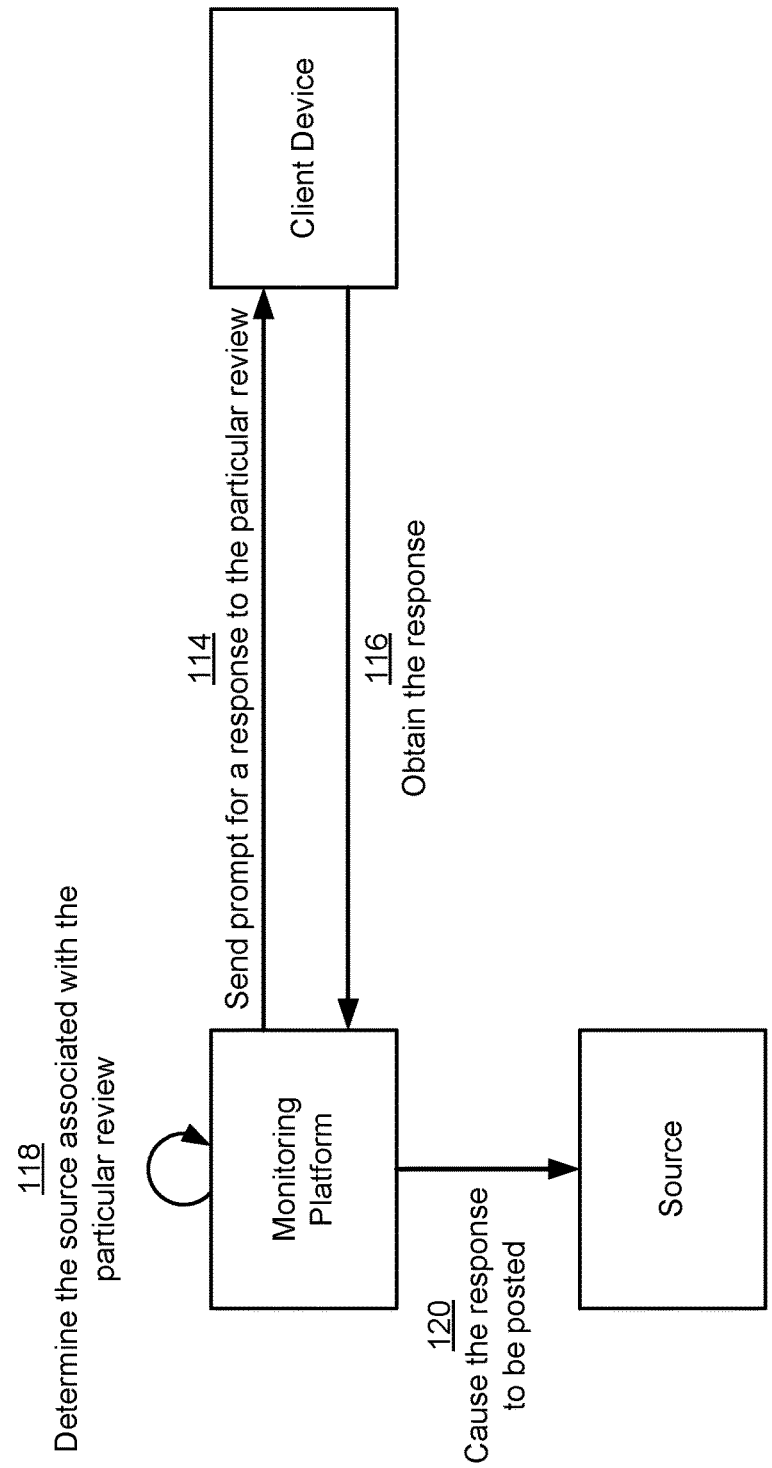

FIGS. 1A-1C are diagrams of one or more example implementations 100 described herein. As shown in FIGS. 1A-1C, example implementation(s) 100 may include a monitoring platform and/or a client device. The monitoring platform may be a computing device, a server, a cloud computing device, and/or the like. The client device may be a communication and/or computing device, such as a mobile phone, a smartphone, a laptop computer, a tablet computer, and/or the like. In some implementations, the monitoring platform and/or the client device may be connected via a network, such as a wired network (e.g., the Internet or another data network), a wireless network (e.g., a wireless local area network, a wireless wide area network, a cellular network, etc.), and/or the like.

Some example implementations described herein concern a single client device communicating with a single monitoring platform. In some implementations, a plurality of client devices may communicate with one or more monitoring platforms. In some implementations, one or more functions of the monitoring platform may be performed by the client device instead of, or in addition to, being performed by the monitoring platform. In some implementations, one or more functions of the client device may be performed by the monitoring platform instead of, or in addition to, being performed by the client device.

As shown by reference number 102, the monitoring platform may obtain information that identifies a product or service. The product may be a lawn mower, a computer, a cell phone, a movie, a book, a song, a concert, a financial product (e.g., a checking account, a credit card, a mortgage, and/or the like), and/or the like. The service may be a cleaning service, a maintenance service, a lawn service, a financial service, a service concerning a product (e.g., customer service concerning the product), and/or the like. The information that identifies the product or service may include an identifier that identifies the product or service.

As shown by reference number 104, the monitoring platform may obtain one or more reviews. The monitoring platform may obtain the one or more reviews from one or more sources. A source of the one or more sources may include a website, an application, a program, and/or the like. For example, a source may be an e-commerce website (e.g., Amazon.com, Zappos.com, and/or the like), a mobile application (e.g., Yelp, TripAdvisor, and/or the like), and/or the like. The source may be hosted by another device, such as a server device. The one or more reviews may be associated with the product or service.

In some implementations, the one or more sources may assign a label to the one or more reviews, such as "reviews," "remarks," "comments," "responses," "ratings," "notes," and/or the like (e.g., a source, of the one or more sources, may display the one or more reviews in a section of the source designated by the label). In some implementations, a review, of the one or more reviews, may include review information. Review information associated with a review may include: information identifying a source, of the one or more sources, associated with the review (e.g., the source where the review is posted); information identifying a user profile associated with the review (e.g., a user profile associated with authoring and/or posting the review); a comment concerning the product or service (e.g., text included in the review relating to the product or service); a comment concerning an attribute of the product or service (e.g., text included in the review relating to the attribute of the product or service); an image associated with the product or service (e.g., an image of the product or service, an image of the attribute of the product or service, and/or the like); a video associated with the product or service (e.g., a video of the product or service, a video of the attribute of the product or service, and/or the like); a rating associated with the review (e.g., a rating, such as a number of stars, a thumbs-up or a thumbs-down, and/or the like, that indicates a measure of quality, satisfaction, fit, and/or the like associated with the product or service); a submission time associated with the review (e.g., a time that the review was posted to the source); and/or the like.

In some implementations, the monitoring platform may collect the one or more reviews from the one or more sources. For example, the monitoring platform may crawl a plurality of sources (e.g., visit and search the plurality of sources on a scheduled basis, on an on-demand basis, on a triggered basis, on a periodic basis, and/or the like) to identify the one or more sources that include the one or more reviews. The monitoring platform may start at a root page associated with the set of sources and follow links associated with the root page to determine the one or more sources. The monitoring platform may identify the one or more reviews (e.g., by searching the one or more sources for relevant reviews based on the information that identifies the product or service) and scrape the one or more reviews from the one or more sources (e.g., collect the one or more reviews and/or the respective review information associated with the one or more reviews from the one or more sources).

As shown by reference number 106, the monitoring platform may select a set of reviews, of the one or more reviews, based on one or more factors, such as a content associated with the one or more reviews, a date associated with the one or more reviews, and/or the like. For example, the monitoring platform may select a set of reviews that include a comment concerning a particular attribute of the product or service (e.g., a set of reviews, of the one or more reviews, that include complaints concerning the particular attribute of the product or service). As another example, the monitoring platform may select a set of reviews that include one or more keywords (e.g., a set of reviews, of the one or more reviews, that include the one or more keywords in the comments concerning the product or service). In another example, the monitoring platform may select a set of reviews that have a submission time that satisfies a threshold (e.g., a set of reviews, of the one or more reviews, that were posted in the last 3 hours).

In some implementations, the monitoring platform may cause the set of reviews to be stored in a data structure. The monitoring platform may send a message (e.g., an electronic message, such as an email, an instant message, a text message, and/or the like) to the client device, or other devices, that the set of reviews have been stored in the data structure. Additionally, or alternatively, the platform may send, the message to a messaging address, a messaging topic, a messaging channel, and/or the like of an electronic messaging platform that can be accessed by the client device or other devices. The monitoring platform may select the messaging address, the messaging topic, the messaging channel, and/or the like based on the one or more factors associated with the set of reviews. The message may include one or more links, such as a link to each review of the set of reviews, a link to the data structure, a link to the one or more sources, and/or the like. The client device may receive and/or access the message and display the message on a display of the client device. A user of the client device, by interacting with a user interface of the client device, may cause the client device to select the one or more links to access the set of reviews, the data structure, the one or more sources, and/or the like.

Some implementations described herein in relation to FIGS. 1B-1C include functions that can be performed by the monitoring platform in addition to, or as an alternative to, the functions described herein in relation to FIG. 1A. The functions described in relation to FIGS. 1B-1C are optional, such that any one of these functions may be performed by the monitoring platform alone or in combination with any other functions described in relation to FIGS. 1A-1C.

As shown in FIG. 1B and by reference number 108, the monitoring platform may determine respective additional review information associated with each review of the one or more reviews. For a review, the additional review information may include: at least one indicator of sentiment associated with the review; a review history associated with a user profile associated with the review; an indicator of review authenticity; a measure of influence associated with the user profile; and/or the like.

In some implementations, the monitoring platform may process the one or more reviews to determine the respective additional review information associated with each review of the one or more reviews. For example, for a review of the one or more reviews, the monitoring platform may process, using a sentiment analysis technique, the review and/or the review information associated with the review to determine the sentiment associated with the review (e.g., whether the review is positive and/or negative; whether an experience with the product or service is good and/or bad; and/or the like). In another example, the monitoring platform may process the one or more reviews to determine a respective user profile associated with each review of the one or more reviews (e.g. a respective user profile associated with authoring and/or posting each review). For a review of the one or more reviews, the monitoring platform may determine a review history of the associated user profile (e.g., information related to other reviews associated with the user profile). The monitoring platform may determine a measure of influence of the user profile based on the review history (e.g., determine whether the other reviews of the review history were designated as helpful reviews). In an additional example, the monitoring platform may, for a review, of the one or more reviews: identify a user profile associated with the review; determine, based on the user profile, a history of user reviews concerning the user profile; and determine, based on the history of user reviews, an indicator of review authenticity concerning the review (e.g., process the history of user reviews (e.g., using a natural language processing technique) to determine whether the history of user reviews were: authored by a human or by an automated system; sponsored by a third-party; and/or the like).

As shown by reference number 110, the monitoring platform may select a particular review of the one or more reviews. The monitoring platform may select the particular review based on the review information and/or the additional review information associated with the one or more reviews. For example, the monitoring platform may select a particular review because the review information and the additional review information associated with the particular review indicates that the user profile associated with the particular review has a high measure of influence, that a content of the particular review has a negative sentiment, and/or the like. In this way, the monitoring platform facilitates in identifying a particular review that has a higher likelihood of influencing readers of the particular review than other reviews.

In some implementations, the monitoring platform may use a machine learning model to select the particular review. For example, the monitoring platform may process the one or more reviews using the machine learning model to estimate a respective relevancy score of the one or more reviews and the monitoring platform may select the particular review based on the relevancy scores of the one or more reviews (e.g., the monitoring platform may select the particular review because the particular review has a high relevancy score, which may indicate that the particular review is a legitimate, unique, important, and/or high profile review that requires a response).

In some implementations, the monitoring platform may generate and/or train the machine learning model. For example, the monitoring platform may obtain historical information concerning review information of a plurality of reviews and historical information concerning additional review information associated with the plurality of reviews (hereinafter collectively referred to as the "historical information") to generate and/or train the machine learning model. In some implementations, the monitoring platform may process the historical information to train the machine learning model to predict a respective relevancy score associated with the plurality of reviews.

In some implementations, the monitoring platform may perform a set of data manipulation procedures to process the historical information to generate the machine learning model, such as a data pre-processing procedure, a model training procedure, a model verification procedure, and/or the like. For example, the monitoring platform may preprocess the historical information to remove irrelevant information, confidential data, corrupt data, and/or the like. In this way, the monitoring platform may organize thousands, millions, or billions of data points for machine learning and model generation.

In some implementations, the monitoring platform may perform a training operation when generating the machine learning model. For example, the monitoring platform may portion the historical information into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, a minimum feature set may be created from pre-processing and/or dimensionality reduction of the historical information. In some implementations, the monitoring platform may train the machine learning model on this minimum feature set, thereby reducing processing required to train the machine learning model, and may apply a classification technique to the minimum feature set.

In some implementations, the monitoring platform may use a classification technique, such as a logistic regression classification technique, a random forest classification technique, a gradient boosting machine (GBM) classifier technique, and/or the like to determine a categorical outcome (e.g., that particular historical information is associated with a particular relevancy score). Additionally, or alternatively, the monitoring platform may perform a recursive feature elimination procedure to split the data of the minimum feature set into partitions and/or branches, and use the partitions and/or branches to perform predictions (e.g., that particular historical information is associated with a particular relevancy score). Based on using the recursive feature elimination procedure, the monitoring platform may reduce utilization of computing resources relative to manual, linear sorting and analysis of data points, thereby enabling use of thousands, millions, or billions of data points to train the machine learning model, which may result in a more accurate machine learning model than using fewer data points.

Additionally, or alternatively, the monitoring platform may use a support vector machine (SVM) classifier technique to generate a non-linear boundary between data points in the training set. In this case, the non-linear boundary is used to classify test data (e.g., historical information) into a particular class (e.g., a class indicating that particular historical information is associated with a particular relevancy score).

Additionally, or alternatively, the monitoring platform may train the machine learning model using a supervised training procedure that includes receiving input to the model from a subject matter expert, which may reduce an amount of time, an amount of processing resources, and/or the like to train the machine learning model relative to an unsupervised training procedure. In some implementations, the monitoring platform may use one or more other model training techniques, such as a neural network technique, a latent semantic indexing technique, and/or the like. For example, the monitoring platform may perform an artificial neural network processing technique (e.g., using a two-layer feedforward neural network architecture, a three-layer feedforward neural network architecture, and/or the like) to perform pattern recognition with regard to patterns of particular historical information associated with particular relevancy scores. In this case, using the artificial neural network processing technique may improve an accuracy of the machine learning model generated by the monitoring platform by being more robust to noisy, imprecise, or incomplete data, and by enabling the monitoring platform to detect patterns and/or trends undetectable to human analysts or systems using less complex techniques.

In some implementations, a different device, such as a server device, may generate and train the machine learning model. The different device may send the machine learning model to the monitoring platform. The different device may update and send (e.g., on a scheduled basis, on an on-demand basis, on a triggered basis, on a periodic basis, and/or the like) the machine learning model to the monitoring platform.

Accordingly, the monitoring platform may use artificial intelligence techniques, machine learning techniques, deep learning techniques, and/or the like to determine an association between review information and/or additional review information and a predicted relevancy score.

As shown by reference number 112, the monitoring platform may cause one or more actions to be performed based on the particular review. The one or more actions may include: testing the product or service associated with the particular review; testing an attribute of the product or service; generating and sending an electronic message, a discount offer, a financial offer, and/or the like to a user associated with the particular review; causing ads and/or sale listings concerning the product or service to be removed from the source; updating an order (e.g., modifying an order amount, cancelling an order, and/or the like) for the product with a manufacturer of the product; updating delivery (e.g., expediting delivery, delaying delivery, cancelling delivery, and/or the like) of the product or service to a consumer; causing a meeting to be scheduled (e.g., causing electronic calendar invites to be sent) for personnel associated with the product or service (e.g., managers, sales agents, designers, engineers, and/or the like) to discuss the product or service; and/or the like.

For example, the monitoring platform may generate a testing protocol based on the particular review and may cause the product or service to be tested based on the testing protocol. The testing protocol may include one or more instructions that, when received by a different device, cause the different device to execute the one or more instructions. The monitoring platform may send the one or more instructions to the different device to cause the different device to execute the one or more instructions and thereby test the product or service. In another example, the monitoring platform may identify an attribute, of the product or service, that is a subject of the particular review and may cause the attribute of the product or service to be tested in a similar manner.

As another example, the monitoring platform may identify a user associated with the particular review based on the review information and/or the additional review information associated with the particular review (e.g., the monitoring platform may determine a user profile based on the review information and/or the additional review information and perform a lookup, based on the user profile, in a data structure that includes user information to identify the user). The monitoring platform may determine an address (e.g., an electronic message address, a physical location address, and/or the like) of the user and send a message to the address related to the particular review. The message may include information concerning the particular review and and/or other information, such as a discount offer (e.g., a rebate offer) concerning the product or service and/or other products or service, a financial offer (e.g., a financing offer, a gift card, a refund, and/or the like) concerning the product or service and/or other products or service, and/or the like.

In some implementations, the monitoring platform may perform at least one action, of the one or more actions, only after receiving approval from a user of the client device. For example, the monitoring platform may send a message to the client device asking for permission to perform the at least one action. The client device may receive the message, and based on receiving the message, may cause display of the message on a display of the client device. The user may interact with a user interface of the client device to indicate that the monitoring platform has permission to perform the at least one action. The client device may send a reply that indicates permission to perform the at least one action to the monitoring platform, which causes the monitoring platform to perform the at least one action.

In some implementations, the monitoring platform may obtain, after causing the at least one action to be performed, a message regarding the at least one action. The message may include information related to testing of the product or service (e.g., information concerning one or more results related to testing the product or service); information related to testing of an attribute of the product or service (e.g., information concerning one or more results related to testing the attribute of the product or service); information related to delivery of an electronic message, a discount offer, a financial offer, and/or the like to a user associated with the particular review (e.g., information concerning a delivery status, a read status, a utilization status, and/or the like of the message, the discount offer, the financial offer, and/or the like); and/or the like. The monitoring platform may cause display, on a display of a client device, of the message.

In some implementations, the monitoring platform may generate a suggested response to the particular review. For example, the monitoring platform may process the particular review to determine a comment concerning the product or service and may generate the suggested response based on the comment.

In some implementations, the monitoring platform may use an additional machine learning model to generate the suggested response. In some implementations, the monitoring platform may receive, generate, and/or train the additional machine learning model in a similar manner as described herein in relation to the machine learning model described above. For example, the monitoring platform may obtain information concerning historical reviews and responses concerning the product or service (hereinafter collectively referred to as the "additional historical information") to generate and/or train the additional machine learning model. In some implementations, the monitoring platform may process the additional historical information to train the second machine learning model to determine, for a particular review, a particular suggested response. In some implementations, the monitoring platform may perform a set of data manipulation procedures, perform a training operation, use a classification technique, perform a recursive feature elimination procedure, and/or the like as described herein to determine an association between a review and a suggested response. The monitoring platform may process the particular review to determine a comment concerning the product or service and may generate the suggested response (e.g., using the additional machine learning model) based on the comment.

As shown in FIG. 1C and by reference number 114, the monitoring platform may send the particular review, the suggested response, and/or a prompt for a response to the particular review to the client device. The client device may display the particular review, the suggested response, and/or the prompt on a display of the client device based on receiving the particular review, the suggested response, and/or the prompt. A user of the client device may, after viewing the particular review, the response, and/or the prompt on the display of the client device, input the response into the client device. For example, the user may enter the response into the client device via a user interface of the client device. As another example, the user may select the suggested response as the response via the user interface of the client device. As shown by reference number 116, the monitoring platform may obtain the response from the client device. For example, the client device may send the response to the monitoring platform.

As shown by reference number 118, the monitoring platform may determine the source associated with the particular review. For example, the monitoring platform may determine, based on the review information included in the particular review, the source, of the one or more sources, associated with the particular review.

As shown by reference number 120, the monitoring platform may cause the response to be posted. The monitoring platform may cause the response to be posted to the source associated with the particular review. For example, the monitoring platform may determine an application programming interface (API) associated with the source and may send the response to the source via the API to cause the source to post the response in connection with the particular review. In another example, the monitoring platform may set up a user account associated with the source and/or log in to the user account, navigate at the source to a location where the particular review is posted, and/or post the response in association with the particular review.

In some implementations, the monitoring platform may generate a message related to posting the response and send the message to a different device, such as the client device, to cause the different device to display the message on a display of the different device. The message may include information concerning the particular review, information identifying the source, the review information included in the particular review, the additional review information associated with the particular review, the suggested response, the prompt, the response, and/or the like. The message may include one or more links, such as a link to the source, a link to the particular review, a link to the response, and/or the like. The different device may receive and/or access the message and display the message on a display of the different device. A user of the different device, by interacting with a user interface of the different device, may cause the different device to select the one or more links to access the source, the particular review, the response, and/or the like.

Additionally, or alternatively, the monitoring platform may cause the machine learning model to be updated based on information identifying the particular review, the review information included in the particular review, the additional review information associated with the particular review, the suggested response, the prompt, the response, and/or the like.

Additional and/or alternative implementations are contemplated as well. For example, in some implementations, the monitoring platform may obtain first information that identifies a first product or service and second information that identifies a second product or service in a similar manner as described herein in relation to FIG. 1A. The monitoring platform may obtain one or more reviews associated with the first product or service from a first set of one or more sources and one or more reviews associated with the second product or service from a second set of one or more sources in a similar manner as described herein in relation to FIG. 1A. The first set of one or more sources and the second set of one or more sources may include some or all of the same sources. The monitoring platform may select a first set of reviews of the one or more reviews associated with the first product or service and a second set of reviews of the one or more reviews associated with the second product or service in a similar manner as described herein in relation to FIG. 1A. The monitoring platform may cause the first set of reviews and the second set of reviews to be stored in a data structure in a similar manner as described herein in relation to FIG. 1A. The monitoring platform may send a message to the client device, or other devices, that includes one or more links associated with the first set of reviews and the second set of reviews. The message may cause the client device, or other devices, to display one or more reviews of the first set of reviews concurrently with one or more reviews of the second set of reviews. A user of the client device, by interacting with a user of the client device, may cause the client device, based on the message, to display at least one particular review of the first set of reviews next to at least one particular review of the second set of reviews on a display of the client device at the same.

As indicated above, FIGS. 1A-1C are provided merely as examples. Other examples may differ from what is described with regard to FIGS. 1A-1C.

Figure 2:
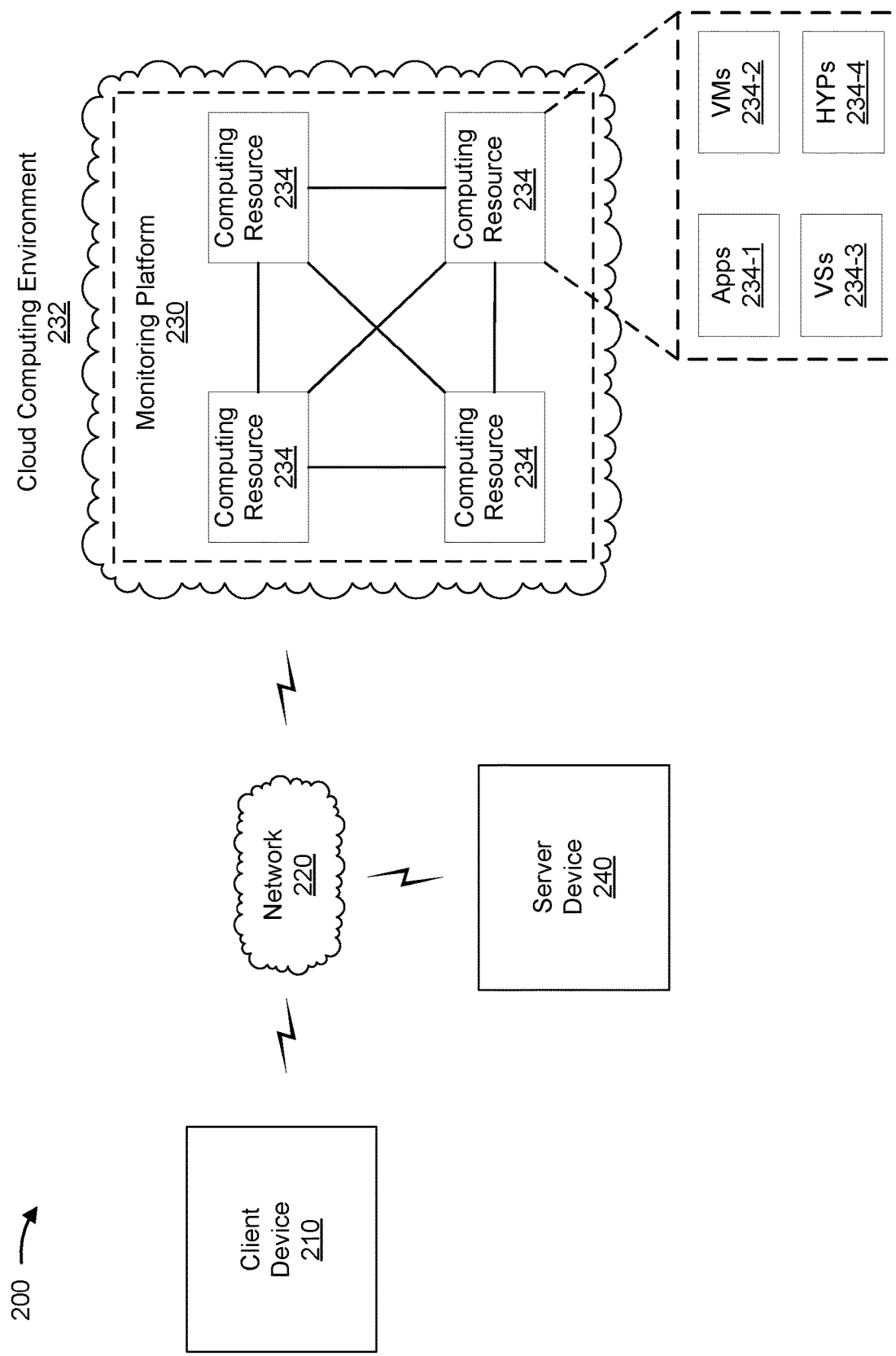
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a network 220, a monitoring platform 230 in a cloud computing environment 232 that includes computing resources 234, and/or the like. Devices of environment 200 may interconnect via wired connections, wireless connections, or a combination of wired and wireless connections.

Client device 210 includes one or more devices capable of receiving, generating, storing, processing, analyzing, and/or providing information, such as information described herein. For example, client device 210 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. Client device 210 may include a camera and may be configured to capture an image using the camera. In some implementations, client device 210 may receive information from and/or transmit information to monitoring platform 230, and/or the like.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

Monitoring platform 230 includes one or more devices capable of obtaining information that identifies a product or service, obtaining one or more related to the product or service, and/or selecting and storing a set of reviews of the one or more reviews. In some implementations, monitoring platform 230 may determine respective additional information associated with each review of the one or more reviews, select at least one particular review of the one or more reviews, and/or cause one or more actions to be performed based on the at least one particular review. In some implementations, monitoring platform 230 may send a prompt for a response to the at least one particular review, obtain the response, determine a source associated with the at least one particular review, and/or cause the response to be posted in association with the at least one particular review. In some implementations, monitoring platform 230 may be designed to be modular such that certain software components may be swapped in or out depending on a particular need. As such, monitoring platform 230 may be easily and/or quickly reconfigured for different uses. In some implementations, monitoring platform 230 may receive information from and/or transmit information to client device 210, such as via network 220.

In some implementations, as shown, monitoring platform 230 may be hosted in a cloud computing environment 232. Notably, while implementations described herein describe monitoring platform 230 as being hosted in cloud computing environment 232, in some implementations, monitoring platform 230 may be non-cloud-based (i.e., may be implemented outside of a cloud computing environment) or may be partially cloud-based.

Cloud computing environment 232 includes an environment that hosts monitoring platform 230. Cloud computing environment 232 may provide computation, software, data access, storage, etc. services that do not require end-user knowledge of a physical location and configuration of system(s) and/or device(s) that hosts monitoring platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host monitoring platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, and/or the like.

Application 234-1 includes one or more software applications that may be provided to or accessed by client device 210. Application 234-1 may eliminate a need to install and execute the software applications on client device 210. For example, application 234-1 may include software associated with monitoring platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Server device 240 includes one or more devices capable of storing, processing, and/or routing information associated with the one or more reviews. For example, server device 240 may include computing resources that may be utilized in connection with storing and providing access to information associated with the one or more reviews. In some implementations, server device 240 may include a communication interface that allows server device 240 to receive information from and/or transmit information to other devices in environment 200, such as client device 210 and/or monitoring platform 230.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
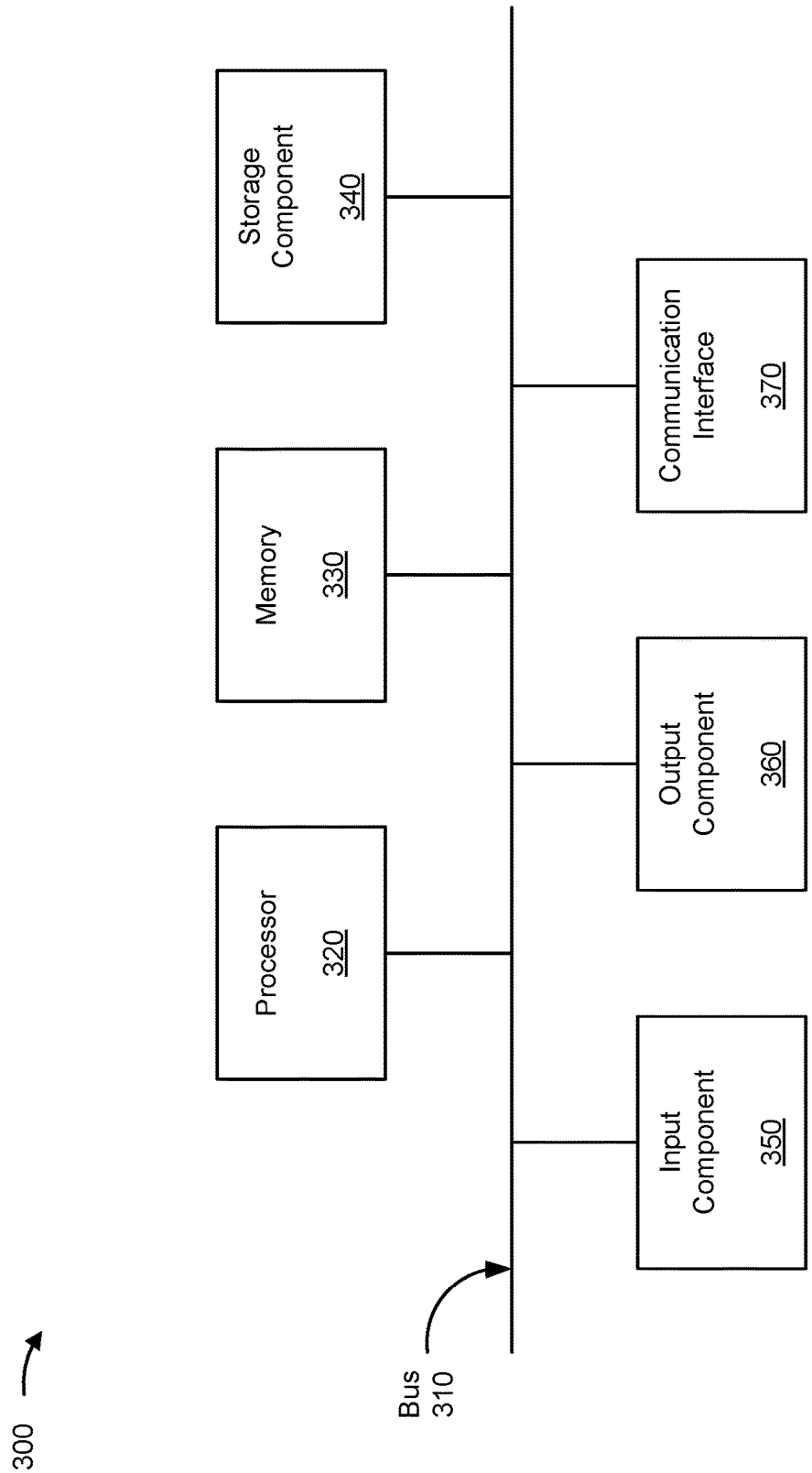
FIG. 3 is a diagram of example components of one or more devices of FIG. 2.

FIG. 3 is a diagram of example components of a device 300. Device 300 may correspond to client device 210, monitoring platform 230, computing resource 234, server device 240, and/or the like. In some implementations, client device 210, monitoring platform 230, computing resource 234, server device 240, and/or the like may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
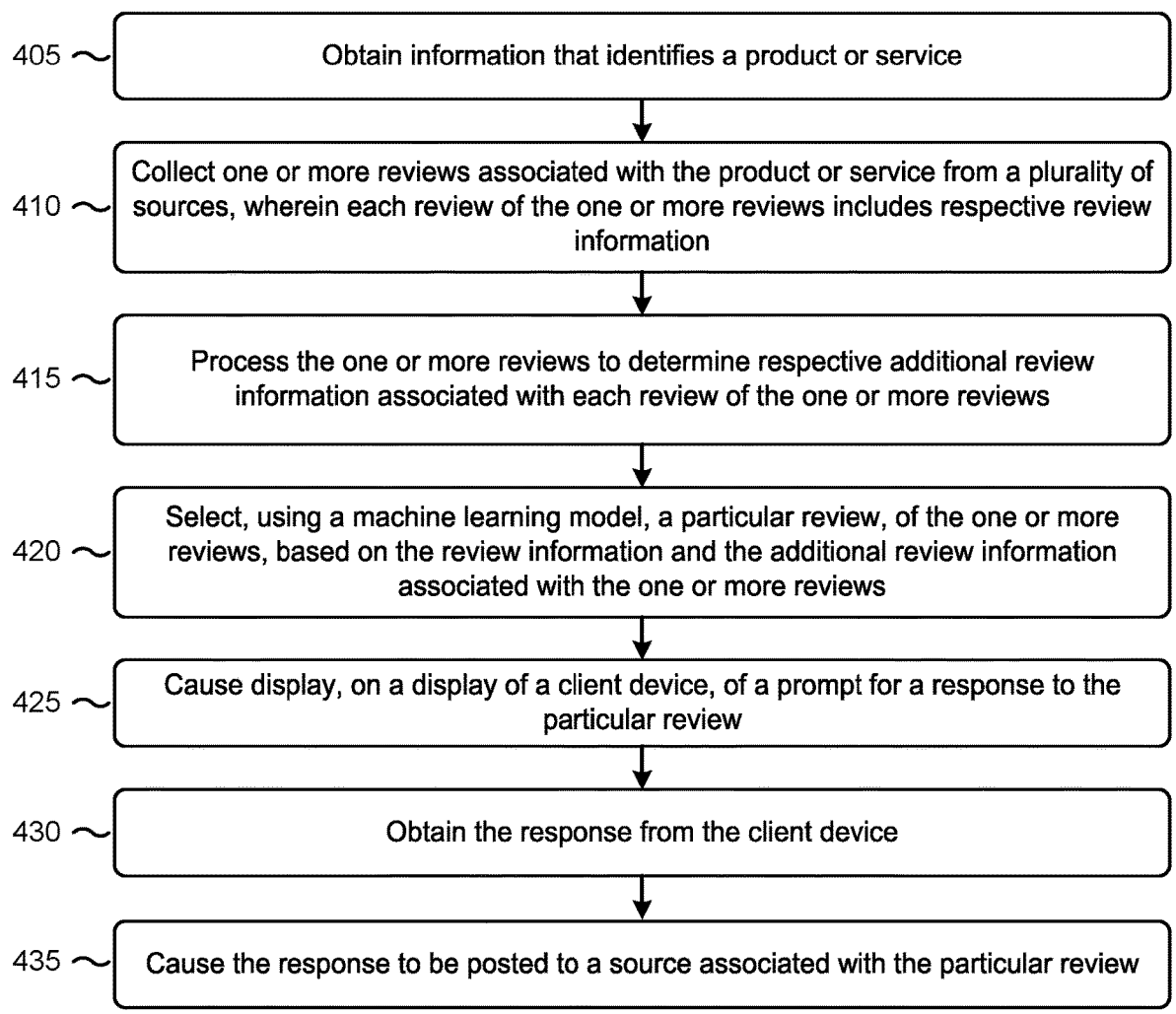
FIGS. 4-6 are flow charts of example processes for facilitating responding to multiple product or service reviews associated with multiple sources.

FIG. 4 is a flow chart of an example process 400 for facilitating responding to multiple product or service reviews associated with multiple sources. In some implementations, one or more process blocks of FIG. 4 may be performed by a monitoring platform (e.g., monitoring platform 230). In some implementations, one or more process blocks of FIG. 4 may be performed by another device or a group of devices separate from or including the monitoring platform, such as a client device (e.g., client device 210), a server device (e.g., server device 240), and/or the like.

As shown in FIG. 4, process 400 may include obtaining information that identifies a product or service (block 405). For example, the monitoring platform (e.g., using computing resource 234, processor 320, memory 330, storage component 340, input component 350, output component 360, communication interface 370 and/or the like) may obtain information that identifies a product or service, as described above.

As further shown in FIG. 4, process 400 may include collecting one or more reviews associated with the product or service from a plurality of sources, wherein each review of the one or more reviews includes respective review information (block 410). For example, the monitoring platform (e.g., using computing resource 234, processor 320, memory 330, storage component 340, input component 350, output component 360, communication interface 370 and/or the like) may collect one or more reviews associated with the product or service from a plurality of sources, as described above. In some implementations, each review of the one or more reviews includes respective review information.

As further shown in FIG. 4, process 400 may include processing the one or more reviews to determine respective additional review information associated with each review of the one or more reviews (block 415). For example, the monitoring platform (e.g., using computing resource 234, processor 320, memory 330, storage component 340, input component 350, output component 360, communication interface 370 and/or the like) may process the one or more reviews to determine respective additional review information associated with each review of the one or more reviews, as described above.

As further shown in FIG. 4, process 400 may include selecting, using a machine learning model, a particular review, of the one or more reviews, based on the review information and the additional review information associated with the one or more reviews (block 420). For example, the monitoring platform (e.g., using computing resource 234, processor 320, memory 330, storage component 340, input component 350, output component 360, communication interface 370 and/or the like) may select, using a machine learning model, a particular review, of the one or more reviews, based on the review information and the additional review information associated with the one or more reviews, as described above.

As further shown in FIG. 4, process 400 may include causing display, on a display of a client device, of a prompt for a response to the particular review (block 425). For example, the monitoring platform (e.g., using computing resource 234, processor 320, memory 330, storage component 340, input component 350, output component 360, communication interface 370 and/or the like) may cause display, on a display of a client device, of a prompt for a response to the particular review, as described above.

As further shown in FIG. 4, process 400 may include obtaining, by the device, the response from the client device (block 430). For example, the monitoring platform (e.g., using computing resource 234, processor 320, memory 330, storage component 340, input component 350, output component 360, communication interface 370 and/or the like) may obtain the response from the client device, as described above.

As further shown in FIG. 4, process 400 may include causing the response to be posted to a source associated with the particular review (block 435). For example, the monitoring platform (e.g., using computing resource 234, processor 320, memory 330, storage component 340, input component 350, output component 360, communication interface 370 and/or the like) may cause the response to be posted to a source associated with the particular review, as described above.

Process 400 may include additional implementations, such as any single implementation or any combination of implementations described below and/or in connection with one or more other processes described elsewhere herein.

In some implementations, when collecting the one or more reviews, the monitoring platform may collect a plurality of reviews from the plurality of sources; may identify a set of reviews, of the plurality of reviews, that are associated with the product or service; and may select the one or more reviews, of the set of reviews, based on a content associated with the one or more reviews. In some implementations, the machine learning model has been trained to select the particular review based on the review information and the additional review information associated with the one or more reviews.

In some implementations, when processing the one or more reviews to determine the respective additional review information associated with each review of the one or more reviews, the monitoring platform may process, using a sentiment analysis technique, the one or more reviews to determine a respective sentiment associated with each review of the one or more reviews. In some implementations, when processing the one or more reviews to determine the respective additional review information associated with each review of the one or more reviews, the monitoring platform may process the one or more reviews to determine a respective user profile associated with each review of the one or more reviews and may a determine a respective measure of influence of the respective user profile associated with each review of the one or more reviews.

In some implementations, when processing the one or more reviews to determine the respective additional review information associated with each review of the one or more reviews, the monitoring platform may, for a review of the one or more reviews: may identify a user profile associated with the review; may determine, based on the user profile, a history of user reviews concerning the user profile; and may determine, based on the history of user reviews, an indicator of review authenticity concerning the review. In some implementations, when causing the response to be posted to the source, the monitoring platform may determine an application programming interface (API) associated with the source and may send the response to the source via the API to cause the source to post the response in connection with the particular review.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
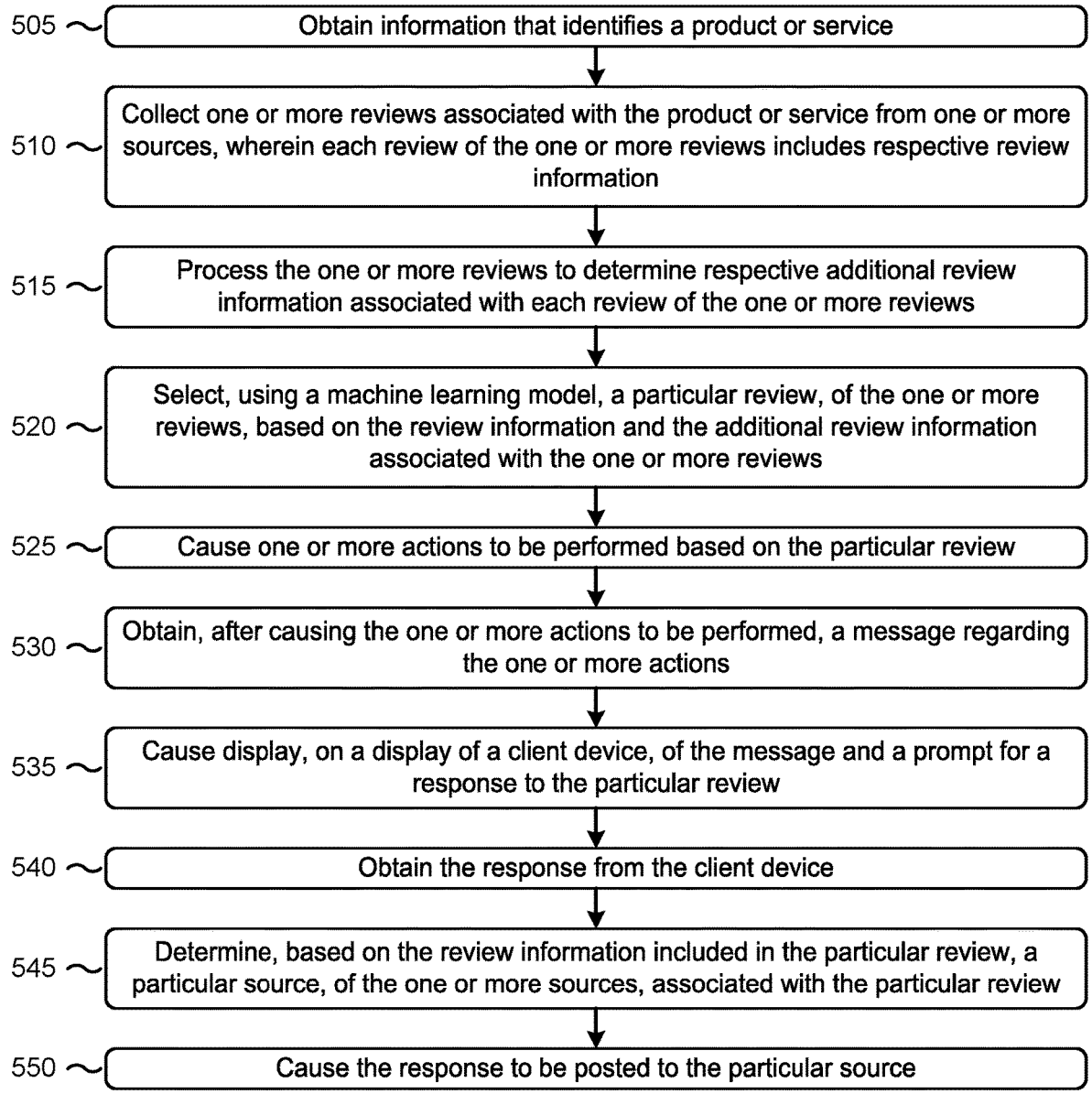

FIG. 5 is a flow chart of an example process 400 for facilitating responding to multiple product or service reviews associated with multiple sources. In some implementations, one or more process blocks of FIG. 5 may be performed by a monitoring platform (e.g., monitoring platform 230). In some implementations, one or more process blocks of FIG. 5 may be performed by another device or a group of devices separate from or including the monitoring platform, such as a client device (e.g., client device 210), a server device (e.g., server device 240), and/or the like.

As shown in FIG. 5, process 500 may include obtaining information that identifies a product or service (block 505). For example, the monitoring platform (e.g., using computing resource 234, processor 320, memory 330, storage component 340, input component 350, output component 360, communication interface 370 and/or the like) may obtain information that identifies a product or service, as described above.

As further shown in FIG. 5, process 500 may include collecting one or more reviews associated with the product or service from one or more sources, wherein each review of the one or more reviews includes respective review information (block 510). For example, the monitoring platform (e.g., using computing resource 234, processor 320, memory 330, storage component 340, input component 350, output component 360, communication interface 370 and/or the like) may collect one or more reviews associated with the product or service from one or more sources, as described above. In some implementations, each review of the one or more reviews includes respective review information.

As further shown in FIG. 5, process 500 may include processing the one or more reviews to determine respective additional review information associated with each review of the one or more reviews (block 515). For example, the monitoring platform (e.g., using computing resource 234, processor 320, memory 330, storage component 340, input component 350, output component 360, communication interface 370 and/or the like) may process the one or more reviews to determine respective additional review information associated with each review of the one or more reviews, as described above.

As further shown in FIG. 5, process 500 may include selecting, using a machine learning model, a particular review, of the one or more reviews, based on the review information and the additional review information associated with the one or more reviews (block 520). For example, the monitoring platform (e.g., using computing resource 234, processor 320, memory 330, storage component 340, input component 350, output component 360, communication interface 370 and/or the like) may select, using a machine learning model, a particular review, of the one or more reviews, based on the review information and the additional review information associated with the one or more reviews, as described above.

As further shown in FIG. 5, process 500 may include causing one or more actions to be performed based on the particular review (block 525). For example, the monitoring platform (e.g., using computing resource 234, processor 320, memory 330, storage component 340, input component 350, output component 360, communication interface 370 and/or the like) may cause one or more actions to be performed based on the particular review, as described above.

As further shown in FIG. 5, process 500 may include obtaining, after causing the one or more actions to be performed, a message regarding the one or more actions (block 530). For example, the monitoring platform (e.g., using computing resource 234, processor 320, memory 330, storage component 340, input component 350, output component 360, communication interface 370 and/or the like) may obtain, after causing the one or more actions to be performed, a message regarding the one or more actions, as described above.

As further shown in FIG. 5, process 500 may include causing display, on a display of a client device, of the message and a prompt for a response to the particular review (block 535). For example, the monitoring platform (e.g., using computing resource 234, processor 320, memory 330, storage component 340, input component 350, output component 360, communication interface 370 and/or the like) may cause display, on a display of a client device, of the message and a prompt for a response to the particular review, as described above.

As further shown in FIG. 5, process 500 may include obtaining the response from the client device (block 540). For example, the monitoring platform (e.g., using computing resource 234, processor 320, memory 330, storage component 340, input component 350, output component 360, communication interface 370 and/or the like) may obtain the response from the client device, as described above.

As further shown in FIG. 5, process 500 may include determining, based on the review information included in the particular review, a particular source, of the one or more sources, associated with the particular review (block 545). For example, the monitoring platform (e.g., using computing resource 234, processor 320, memory 330, storage component 340, input component 350, output component 360, communication interface 370 and/or the like) may determine, based on the review information included in the particular review, a particular source, of the one or more sources, associated with the particular review, as described above.

As further shown in FIG. 5, process 500 may include causing the response to be posted to the particular source (block 550). For example, the monitoring platform (e.g., using computing resource 234, processor 320, memory 330, storage component 340, input component 350, output component 360, communication interface 370 and/or the like) may cause the response to be posted to the particular source, as described above.

Process 500 may include additional implementations, such as any single implementation or any combination of implementations described below and/or in connection with one or more other processes described elsewhere herein.

In some implementations, the review information, included in a review of the one or more reviews, includes at least one of: information identifying a source, of the one or more sources, associated with the review; information identifying a user profile associated with the review; a comment concerning the product or service; a comment concerning an attribute of the product or service; an image associated with the product or service; a rating associated with the review; and/or a submission time associated with the review. In some implementations, the additional review information, associated with a review of the one or more reviews, includes at least one of: at least one indicator of sentiment associated with the review; an indicator of review authenticity; a review history associated with a user profile associated with the review; and/or a measure of influence associated with the user profile.

In some implementations, when causing the one or more actions to be performed, the monitoring platform may generate a testing protocol based on the particular review and may cause the product or service to be tested based on the testing protocol. In some implementations, when causing the one or more actions to be performed, the monitoring platform may identify an attribute, of the product or service, that is a subject of the particular review and may cause the attribute of the product or service to be tested.

In some implementations, the one or more actions may include at least one of: testing the product or service; testing an attribute of the product or service; generating and sending an electronic message to a user associated with the particular review; generating and sending a discount offer to the user associated with the particular review; and/or generating and sending a financial offer to the user associated with the particular review. In some implementations, the message may include at least one of: information related to testing of the product or service; information related to testing of an attribute of the product or service; information related to delivery of an electronic message to a user associated with the particular review; information related to delivery of a discount offer to the user associated with the particular review; and/or information related to delivery of a financial offer to the user associated with the particular review.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
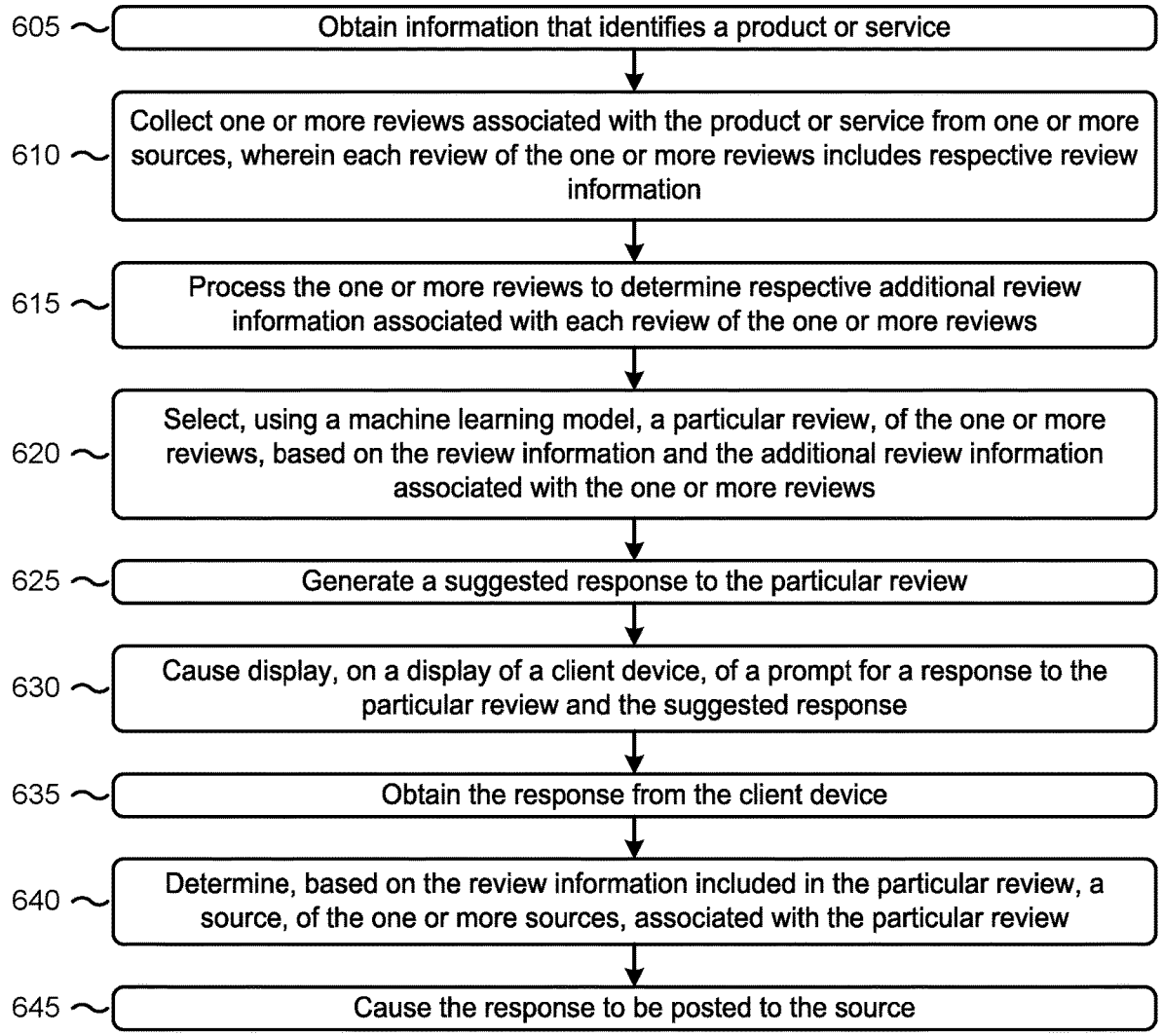

FIG. 6 is a flow chart of an example process 600 for facilitating responding to multiple product or service reviews associated with multiple sources. In some implementations, one or more process blocks of FIG. 6 may be performed by a monitoring platform (e.g., monitoring platform 230). In some implementations, one or more process blocks of FIG. 6 may be performed by another device or a group of devices separate from or including the monitoring platform, such as a client device (e.g., client device 210), a server device (e.g., server device 240), and/or the like.

As shown in FIG. 6, process 600 may include obtaining information that identifies a product or service (block 605). For example, the monitoring platform (e.g., using computing resource 234, processor 320, memory 330, storage component 340, input component 350, output component 360, communication interface 370 and/or the like) may obtain information that identifies a product or service, as described above.

As further shown in FIG. 6, process 600 may include collecting one or more reviews associated with the product or service from one or more sources, wherein each review of the one or more reviews includes respective review information (block 610). For example, the monitoring platform (e.g., using computing resource 234, processor 320, memory 330, storage component 340, input component 350, output component 360, communication interface 370 and/or the like) may collect one or more reviews associated with the product or service from one or more sources, as described above. In some implementations, each review of the one or more reviews includes respective review information.

As further shown in FIG. 6, process 600 may include processing the one or more reviews to determine respective additional review information associated with each review of the one or more reviews (block 615). For example, the monitoring platform (e.g., using computing resource 234, processor 320, memory 330, storage component 340, input component 350, output component 360, communication interface 370 and/or the like) may process the one or more reviews to determine respective additional review information associated with each review of the one or more reviews, as described above.

As further shown in FIG. 6, process 600 may include selecting, using a machine learning model, a particular review, of the one or more reviews, based on the review information and the additional review information associated with the one or more reviews (block 620). For example, the monitoring platform (e.g., using computing resource 234, processor 320, memory 330, storage component 340, input component 350, output component 360, communication interface 370 and/or the like) may select, using a machine learning model, a particular review, of the one or more reviews, based on the review information and the additional review information associated with the one or more reviews, as described above.

As further shown in FIG. 6, process 600 may include generating a suggested response to the particular review (block 625). For example, the monitoring platform (e.g., using computing resource 234, processor 320, memory 330, storage component 340, input component 350, output component 360, communication interface 370 and/or the like) may generate a suggested response to the particular review, as described above.

As further shown in FIG. 6, process 600 may include causing display, on a display of a client device, of a prompt for a response to the particular review and the suggested response (block 630). For example, the monitoring platform (e.g., using computing resource 234, processor 320, memory 330, storage component 340, input component 350, output component 360, communication interface 370 and/or the like) may cause display, on a display of a client device, of a prompt for a response to the particular review and the suggested response, as described above.

As further shown in FIG. 6, process 600 may include obtaining the response from the client device (block 635). For example, the monitoring platform (e.g., using computing resource 234, processor 320, memory 330, storage component 340, input component 350, output component 360, communication interface 370 and/or the like) may obtain the response from the client device, as described above.

As further shown in FIG. 6, process 600 may include determining, based on the review information included in the particular review, a source, of the one or more sources, associated with the particular review (block 640). For example, the monitoring platform (e.g., using computing resource 234, processor 320, memory 330, storage component 340, input component 350, output component 360, communication interface 370 and/or the like) may determine, based on the review information included in the particular review, a source, of the one or more sources, associated with the particular review, as described above.

As further shown in FIG. 6, process 600 may include causing the response to be posted to the source (block 645). For example, the monitoring platform (e.g., using computing resource 234, processor 320, memory 330, storage component 340, input component 350, output component 360, communication interface 370 and/or the like) may cause the response to be posted to the source, as described above.

Process 600 may include additional implementations, such as any single implementation or any combination of implementations described below and/or in connection with one or more other processes described elsewhere herein.

In some implementations, when generating the suggested response to the particular review, the monitoring platform may process the particular review to determine a comment concerning the product or service and may generate the suggested response based on the comment. In some implementations, when generating the suggested response to the particular review, the monitoring platform may process the particular review to determine a comment concerning the product or service; may obtain information concerning historical reviews and responses concerning the product or service; and may generate the suggested response based on the comment and the information concerning the historical reviews and responses.

In some implementations, the monitoring platform may generate a message that includes information concerning the particular review, information identifying the source, the review information included in the particular review, the additional review information associated with the particular review, the suggested response, the prompt, or the response, and may send the message to a different device to cause the different device to display the message on a display of the different device.

In some implementations, the monitoring platform may generate a message that includes a link to the source, a link to the particular review, or a link to the response, and may send the message to a different device to cause the different device to display the message on a display of the different device. In some implementations, the monitoring platform may cause the machine learning model to be updated based on information identifying the particular review, the review information included in the particular review, the additional review information associated with the particular review, the suggested response, the prompt, or the response.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  processing, by a device, one or more reviews associated with a product or a service to determine additional review information for a review of the one or more reviews;
  training, by the device and based on pre-processing historical information to generate a minimum feature set that corresponds to the additional review information, and based on applying a classification technique to the minimum feature set, a machine learning model;
  determining, by the device and based on using the machine learning model, a score associated with the one or more reviews;
  selecting, by the device and based on the score, a particular review of the one or more reviews, wherein the selecting the particular review comprises:
    providing the additional review information as input to the machine learning model; and
    receiving, as an output from the machine learning model, a relevance score indicating a respective measure of importance that is based on the additional review as input to the machine learning model; and causing, based on selecting the particular review, one or more actions to be performed, wherein the one or more actions include:

generating, based on selecting the particular review, a testing protocol; and causing a product or a service to be tested based on the testing protocol, wherein the testing protocol includes one or more instructions that cause another device to test the product or the service.

2. The method of claim 1, further comprising:

receiving, based on sending an electronic message associated with performing the one or more actions, another message associated with performing the one or more actions, wherein the other message is associated with:

information related to testing a service or a product, information related to testing of an attribute of the service or the product, or information related to delivery of the electronic message; and causing display of the other message.

3. The method of claim 1, further comprising:

generating, based on the particular review and based on using an additional machine learning model, a suggested response related to the particular review.

4. The method of claim 1, further comprising:

generating, based on the particular review and based on using an additional machine learning model, a suggested response related to the particular review;

determining an application programming interface (API) associated with a source of the one or more sources; and sending the suggested response via the API to cause posting of the suggested response.

5. The method of claim 1, wherein the one or more actions comprise:

updating an order associated with the product or the service, or causing an ad or a sales listing associated with the product or the service to be removed from a source of the one or more sources.

6. The method of claim 1, wherein processing the one or more reviews to determine the additional review information comprises:

determining, based on a history of reviews associated with a profile related to the review of the one or more reviews, authenticity related to the review of the one or more reviews.

7. The method of claim 1, further comprising:

determining, based on a history of reviews associated with a profile related to the review of the one or more reviews, a measure of influence associated with the profile.

8. A device, comprising:

one or more memories; and one or more processors, coupled to the one or more memories, configured to:

process one or more reviews associated with a product or a service to determine additional review information for a review of the one or more reviews;

train a machine learning model based on pre-processing historical information to generate a minimum feature set that corresponds to the additional review information, and based on applying a classification technique to the minimum feature set;

determine, based on using the machine learning model, a score associated with the one or more reviews;

select, based on the score, a particular review of the one or more reviews, wherein the selecting the particular review comprises:

providing the additional review information as input to the machine learning model; and receiving, as an output from the machine learning model, a relevance score indicating a respective measure of importance that is based on the additional review as input to the machine learning model; and cause, based on selecting the particular review, one or more actions to be performed that include:

generating, based on selecting the particular review, a testing protocol; and causing a product or a service to be tested based on the testing protocol, wherein the testing protocol includes one or more instructions that cause another device to test the product or the service.

9. The device of claim 8, wherein the one or more processors are further configured to:

receive, based on sending an electronic message associated with performing the one or more actions, another message associated with performing the one or more actions, wherein the other message is associated with:

information related to testing a service or a product, information related to testing of an attribute of the service or the product, or information related to delivery of the electronic message; and cause display of the other message.

10. The device of claim 8, wherein the one or more processors are further configured to:

generate, based on the particular review and based on using an additional machine learning model, a suggested response related to the particular review.

11. The device of claim 8, wherein the one or more processors are further configured to:

generate, based on the particular review and based on using an additional machine learning model, a suggested response related to the particular review;

determine an application programming interface (API) associated with a source associated with the one or more reviews; and send the suggested response via the API to cause posting of the suggested response.

12. The device of claim 8, wherein the one or more actions comprise:

updating an order associated with the product or the service, or causing an ad or a sales listing associated with the product or the service to be removed from a source associated with the one or more reviews.

13. The device of claim 8, wherein the one or more processors, to process the one or more reviews to determine the additional review information, are configured to:

determine, based on a history of reviews associated with a profile related to the review of the one or more reviews, authenticity related to the review of the one or more reviews.

14. The device of claim 8, wherein the one or more processors are further configured to:

determine, based on a history of reviews associated with a profile related to the review of the one or more reviews, a measure of influence associated with the profile.

15. A non-transitory computer-readable medium storing a set of instructions, the set of instructions comprising:
one or more instructions that, when executed by one or more processors of a device, cause the device to:
process one or more reviews associated with a product or a service to determine additional review information for a review of the one or more reviews;
train, based on pre-processing historical information to generate a minimum feature set that corresponds to the additional review information and based on applying a classification technique to the minimum feature set, a machine learning model;
determine, based on using the machine learning model, a score associated with the one or more reviews;
select, based on the score, a particular review of the one or more reviews, wherein the selecting the particular review comprises:
providing the additional review information as input to the machine learning model; and
receiving, as an output from the machine learning model, a relevance score indicating a respective measure of importance that is based on the additional review as input to the machine learning model; and
cause, based on selecting the particular review, one or more actions to be performed that include:
generating, based on selecting the particular review, a testing protocol; and
causing a product or a service to be tested based on the testing protocol,
wherein the testing protocol includes one or more instructions that cause another device to test the product or the service.

16. The non-transitory computer-readable medium of claim 15, wherein the one or more instructions further cause the device to:
receive, based on sending an electronic message associated with performing the one or more actions, another message associated with performing the one or more actions,
wherein the other message is associated with:
information related to testing a service or a product,
information related to testing of an attribute of the service or the product, or
information related to delivery of the electronic message; and
cause display of the other message.

17. The non-transitory computer-readable medium of claim 15, wherein the one or more instructions further cause the device to:
generate, based on the particular review and based on using an additional machine learning model, a suggested response related to the particular review.

18. The non-transitory computer-readable medium of claim 15, wherein the one or more instructions further cause the device to:
generate, based on the particular review and based on using an additional machine learning model, a suggested response related to the particular review;
determine an application programming interface (API) associated with a source associated with the one or more reviews; and
send the suggested response via the API to cause posting of the suggested response.

19. The non-transitory computer-readable medium of claim 15, wherein the one or more instructions further cause the device to:
update an order associated with the product or the service, or
cause an ad or a sales listing associated with the product or the service to be removed from a source associated with the one or more reviews.

20. The non-transitory computer-readable medium of claim 15, wherein the one or more instructions further cause the device to:
determine, based on a history of reviews associated with a profile related to the review of the one or more reviews, a measure of influence associated with the profile.

* * * * *